(12) United States Patent
Wang et al.

(10) Patent No.: US 11,328,736 B2
(45) Date of Patent: May 10, 2022

(54) METHOD AND APPARATUS OF DENOISING

(71) Applicant: WEIFANG GOERTEK MICROELECTRONICS CO.,LTD., Weifang (CN)

(72) Inventors: Dexin Wang, Weifang (CN); Xiangju Xu, Weifang (CN); Luyu Duanmu, Weifang (CN)

(73) Assignee: WEIFANG GOERTEK MICROELECTRONICS CO., LTD., Weifang (CN)

( * ) Notice: Subject to any disclaimer, the term of this patent is extended or adjusted under 35 U.S.C. 154(b) by 143 days.

(21) Appl. No.: 16/611,170

(22) PCT Filed: Aug. 28, 2017

(86) PCT No.: PCT/CN2017/099323
§ 371 (c)(1),
(2) Date: Nov. 5, 2019

(87) PCT Pub. No.: WO2018/233010
PCT Pub. Date: Dec. 27, 2018

(65) Prior Publication Data
US 2020/0111504 A1 Apr. 9, 2020

(30) Foreign Application Priority Data

Jun. 22, 2017 (CN) .......................... 201710482616.0

(51) Int. Cl.
*G10L 21/0232* (2013.01)
*G10L 15/20* (2006.01)
(Continued)

(52) U.S. Cl.
CPC .......... *G10L 21/0232* (2013.01); *G10L 15/20* (2013.01); *G10L 15/22* (2013.01); *G10L 25/84* (2013.01); *H04R 3/00* (2013.01)

(58) Field of Classification Search
CPC ......... G10L 15/20; G10L 25/84; G10L 15/22; G10L 21/0232; H04R 3/00
See application file for complete search history.

(56) References Cited

U.S. PATENT DOCUMENTS

| 6,985,860 B2 * | 1/2006 | Nakatsuka ............ G10L 15/065 704/233 |
| 8,165,880 B2 * | 4/2012 | Hetherington .......... G10L 25/87 704/253 |

(Continued)

FOREIGN PATENT DOCUMENTS

| CN | 103155032 | * | 8/2010 | ............. H04R 3/005 |
| CN | 201639753 U | | 11/2010 | |

(Continued)

*Primary Examiner* — Mohammad K Islam
(74) *Attorney, Agent, or Firm* — Maschoff Brennan (57) ABSTRACT

Disclosed are a method and an apparatus of denoising, and the method includes: receiving a first voice signal picked up by a microphone; if it is detected, with the first voice signal, that a sensor is in an operation state, subtracting an interference noise signal from the first voice signal to obtain a first voice signal with the interference removed therefrom, where the interference noise signal is an interference noise signal generated with regard to the microphone during an operation of the sensor, and the sensor and the microphone are packaged in one module; and outputting the first voice signal with the interference removed therefrom. By implementing the solution provided in the present disclosure, interference in a signal collected by a microphone when the microphone and a sensor in a module operate together is reduced and the small size of the module, packaged with the microphone and sensor, is guaranteed.

16 Claims, 3 Drawing Sheets

(51) Int. Cl.
*G10L 15/22* (2006.01)
*G10L 25/84* (2013.01)
*H04R 3/00* (2006.01)

(56) References Cited

U.S. PATENT DOCUMENTS

| | | | | |
|---|---|---|---|---|
| 8,924,204 B2* | 12/2014 | Chen | ...................... | H04R 1/245 |
| | | | | 704/226 |
| 9,280,982 B1* | 3/2016 | Kushner | ............. | G10L 21/0216 |
| 9,459,176 B2* | 10/2016 | Piety | ...................... | G01M 7/00 |
| 9,514,737 B2* | 12/2016 | Takei | ..................... | G10L 15/005 |
| 9,596,529 B2 | 3/2017 | Kappus et al. | | |
| 9,881,632 B1* | 1/2018 | Every | .................... | H04R 3/005 |
| 10,283,113 B2* | 5/2019 | Arndt | ...................... | G10L 15/20 |
| 10,297,245 B1* | 5/2019 | Chen | ...................... | H04R 1/406 |
| 2004/0175006 A1* | 9/2004 | Kim | ........................ | H04R 3/005 |
| | | | | 381/92 |
| 2007/0219784 A1* | 9/2007 | Zhang | .................... | H04R 25/40 |
| | | | | 704/200.1 |
| 2011/0166856 A1* | 7/2011 | Lindahl | ................. | G10L 15/20 |
| | | | | 704/233 |
| 2012/0191447 A1* | 7/2012 | Joshi | ................... | G10L 21/0208 |
| | | | | 704/226 |
| 2012/0278070 A1* | 11/2012 | Herve | ................. | G10L 21/0208 |
| | | | | 704/226 |
| 2013/0044887 A1* | 2/2013 | Dong | ....................... | H04R 3/00 |
| | | | | 381/59 |
| 2013/0208923 A1* | 8/2013 | Suvanto | ................. | H04R 3/005 |
| | | | | 381/122 |
| 2013/0230186 A1* | 9/2013 | Li | ............................ | H04R 3/00 |
| | | | | 381/92 |
| 2014/0122064 A1* | 5/2014 | Osako | ...................... | H04R 3/00 |
| | | | | 704/205 |
| 2014/0122085 A1* | 5/2014 | Piety | ....................... | G01M 7/00 |
| | | | | 704/275 |
| 2014/0177868 A1* | 6/2014 | Jensen | ................ | G10L 21/0208 |
| | | | | 381/94.7 |
| 2014/0188467 A1* | 7/2014 | Jing | ........................ | G10L 25/93 |
| | | | | 704/233 |
| 2015/0256909 A1 | 9/2015 | Kappus et al. | | |
| 2015/0318000 A1* | 11/2015 | Gao | .................... | G10L 21/0208 |
| | | | | 704/226 |
| 2016/0316293 A1* | 10/2016 | Klimanis | ................. | H04R 3/00 |
| 2017/0311068 A1* | 10/2017 | Shin | ...................... | H04R 1/1041 |
| 2018/0366137 A1* | 12/2018 | Ikeda | ...................... | G10L 15/20 |
| 2021/0043223 A1* | 2/2021 | Lee | ...................... | G02B 27/017 |

FOREIGN PATENT DOCUMENTS

| | | | |
|---|---|---|---|
| CN | 102314871 A | 1/2012 | |
| CN | 103155032 A | 6/2013 | |
| CN | 102314871 B | 8/2014 | |
| CN | 105338455 A | 2/2016 | |
| CN | 105764006 A | 7/2016 | |
| DE | 4029697 A1 * | 7/1991 | ............... H04B 1/48 |
| JP | WO2012165657 A1 * | 12/2012 | ............. G10I 15/22 |
| WO | 2015061228 A1 | 4/2015 | |

* cited by examiner

METHOD AND APPARATUS OF DENOISING

CROSS-REFERENCE TO RELATED APPLICATION

The present disclosure claims priority to Chinese Patent Application No. 2017104826160, entitled "a method and an apparatus of denoising", filed on Jun. 22, 2017, which is incorporated herein by reference in its entirety.

FIELD

The present disclosure relates to the field of medical technology, and in particular, to a method and an apparatus of denoising.

BACKGROUND

Nowadays, the microphone and the sensor have become standard equipment for a smart hardware such as a mobile phone. In order to reduce the size space of smart hardware and increase the portability of the hardware, it is necessary to develop a module capable of simultaneously packaging a microphone and a sensor. At present, a specific implementation method is: integrating the microphone and the sensor in one cavity, and opening a small hole in the cavity, the small hole serving as a sound hole of the microphone, and if the sensor needs to communicate with the outside, the small hole also serving as a communication hole between the sensor and the outside.

When the sensor and the microphone are packaged in the same module, since the microphone has high sensitivity, when the sensor and the microphone operate simultaneously, the disturbance generated by the sensor collecting data may cause the sensitive film of the microphone to vibrate, thereby the voice signal collected by the microphone is greatly interfered.

In the prior art, the above interference problem is solved in the following manner: the microphone is separately disposed in a cavity with a small hole, and the sensor is separately disposed in another cavity, and if the sensor needs to communicate with the outside, a through hole is provided on the cavity of the sensor. Although this can solve the above problem, the increase in the number of cavities leads to a large volume of the module packaging the microphone and the sensor, and it is difficult to reduce the package size.

SUMMARY

Aspects of the present disclosure provide a method and an apparatus of denoising, which are used to reduce interference in a signal collected by a microphone when the microphone and a sensor in a module operate together and guarantee the small size of the module, packaged with the microphone and sensor.

In a first aspect, an embodiment of the present disclosure provides a method of denoising, including:
  receiving a first voice signal picked up by a microphone;
  if it is detected, with the first voice signal, that a sensor is in an operation state, subtracting an interference noise signal obtained in advance from the first voice signal so as to obtain a first voice signal with the interference removed therefrom, wherein the interference noise signal is an interference noise signal generated with regard to the microphone during an operation of the sensor, and the sensor and the microphone are packaged in the same module; and
  outputting the first voice signal with the interference removed therefrom.

In a second aspect, an embodiment of the present disclosure provides an apparatus of denoising, including:
  a first receiving module, configured to receive a first voice signal picked up by a microphone;
  a first receiving module, configured to receive a first voice signal picked up by a microphone;
  a first processing module, configured to if it is detected, with the first voice signal, that a sensor is in an operation state, subtract an interference noise signal obtained in advance from the first voice signal so as to obtain a first voice signal with the interference removed therefrom, wherein the interference noise signal is an interference noise signal generated with regard to the microphone during an operation of the sensor, and the sensor and the microphone are packaged in the same module;
  an outputting module, configured to output the first voice signal with the interference removed therefrom In a third aspect, the embodiment of the present disclosure further provides a storage medium, where the storage medium is for storing executable program code, and the executable program code is executed to perform the method of denoising according to the embodiment of the present disclosure.

In a fourth aspect, the embodiment of the present disclosure further provides an application, where the application is operative to perform the method of denoising according to the embodiment of the present disclosure at runtime.

In a fifth aspect, an embodiment of the present disclosure further provides an electronic device, including: a housing, a processor, a memory, a circuit board, and a power supply circuit, where the circuit board is disposed inside a space enclosed by the housing, the processor and the a memory are disposed on the circuit board; the power circuit is for powering each circuit or device; the memory is for storing executable program code; and the processor runs the executable program code stored in the memory to perform the method of denoising according to the embodiment of the present disclosure.

According to a method and an apparatus of denoising provided by the embodiment of the present disclosure, a first voice signal picked up by a microphone is received, if it is detected, with the first voice signal, that a sensor packed in the same module with the microphone is in an operation state, an interference noise signal obtained in advance is subtracted from the first voice signal so as to obtain and output a first voice signal with the interference removed therefrom. Since the interference noise signal is an interference noise signal generated with regard to the microphone during an operation of the sensor, and the interference generated with regard to the microphone during an operation of the sensor can be removed by subtracting an interference noise signal from the first voice signal. Thereby, interference in a signal collected by a microphone when the microphone and a sensor in a module operate together is reduced and the small size of the module, packaged with the microphone and sensor, is guaranteed.

BRIEF DESCRIPTION OF THE DRAWINGS

The drawings described herein are intended to provide a further understanding of the present disclosure, and are intended to be a part of the present disclosure. The example embodiment of the present disclosure and the description thereof are for explaining the present disclosure and do not constitute a limitation to the present disclosure. In the drawings.

DETAILED DESCRIPTION OF EXAMPLE EMBODIMENTS

For making the purposes, technical solutions and advantages of the embodiments of the present invention clearer, the technical solutions in the embodiments of the present invention will be clearly and completely described below in combination with the drawings in the embodiments of the present invention. It is apparent that the described embodiments are not all embodiments but part of embodiments of the present invention. All other embodiments obtained by those of ordinary skill in the art on the basis of the embodiments in the present invention without creative work shall fall within the scope of protection of the present invention.

First, a method of denoising provided by the embodiment of the present disclosure is introduced. The method can be applied to a call device. For example, the call device can be a fixed phone, a smart phone, a fax phone, or the like. Further, the method of denoising provided by the embodiment of the present disclosure may be applied to an apparatus of denoising running on the call device, and the apparatus may be a denoising software, and may also be a functional plug-in of a voice processing software or a voice playing software.

Figure 1:
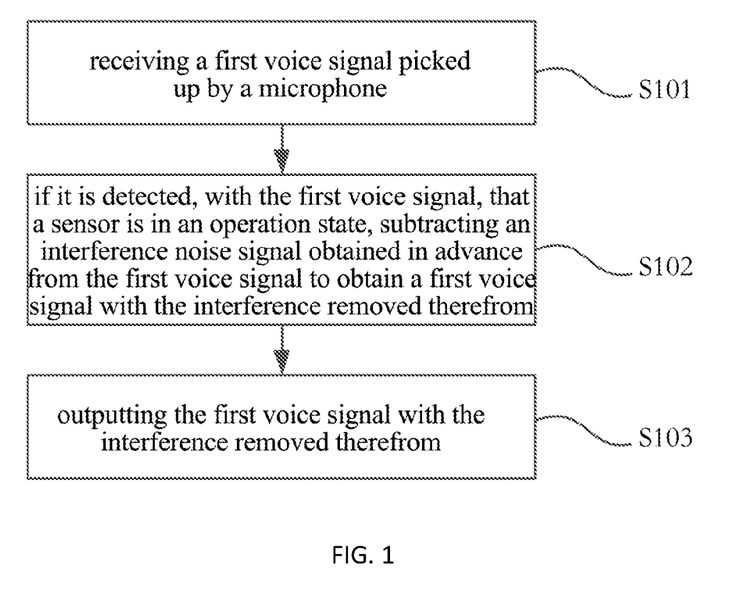
FIG. 1 is a flow chart of steps of a method of denoising according to an embodiment of the present disclosure.

As shown in FIG. 1, a method of denoising provided by an embodiment of the present disclosure includes the following steps:

S101: receiving a first voice signal picked up by a microphone.

When a user speaks to the microphone, regarded as sending a voice signal, the microphone picks up the voice signal as the first voice signal. The embodiment of the present disclosure receives the first voice signal picked up by the microphone to process the first voice signal.

The microphone that picks up the signal may be a built-in microphone or a peripheral device that is communicatively coupled to the executive body. The embodiment of the present disclosure does not limit the connection manner between the peripheral device and the execution body.

It should be noted that the voice signal in the embodiment of the present disclosure may be a signal having a frequency in the range of 20 Hz to 20 kHz, or may be a voice signal having a frequency in any of the above range.

S102: if it is detected, with the first voice signal, that a sensor is in an operation state, subtracting an interference noise signal obtained in advance from the first voice signal so as to obtain a first voice signal with the interference removed therefrom, where the interference noise signal is an interference noise signal generated with regard to the microphone during an operation of the sensor, and the sensor and the microphone are packaged in the same module.

If it is detected that the sensor packaged in the same module with the microphone is in the operation state when the first voice signal is received, the received first voice signal is subtracted from the preset interference noise signal to remove interference.

Optionally, the sensor may be an air pressure sensor, a temperature sensor, a humidity sensor, an acceleration sensor, a gyroscope, a gas sensor, or the like.

Optionally, in the embodiment of the present disclosure, the module may be a cavity with a small hole. If the sensor is the air pressure sensor, the small hole is both a sound hole of the microphone and a communication hole between the air pressure sensor and the outside.

It can be understood that the embodiment of the present disclosure can determine whether the sensor is in the operation state by detecting an electrical signal input to the sensor. For example, if it is detected that the electrical signal input to the sensor is a high level signal, it is determined that the sensor is in the operation state; and if it is detected that the electrical signal input to the sensor is a low level signal, it is determined that the sensor is in a non-operation state.

Optionally, the step of detecting the operation state of the sensor may further include: detecting whether the signal collected by the sensor is received, and when the above signal is received, determining that the sensor is in the operation state. Or, a status indicator is set for the sensor. When the sensor operates, the status indicator is set to a preset state. Therefore, when the status identifier is the preset status, the state of the sensor is confirmed to be the operation state, and the preset status may be, for example, a state that an indicator light is on.

If it is detected that the sensor is in the operation state, the interference caused by the sensor in the first voice signal is removed. The specific manner may be that the interference noise signal is subtracted from the first voice signal. After the interference noise signal is removed, S103 is performed. Specifically, the interference noise signal is an interference noise signal generated with regard to the microphone during the operation of the sensor. Therefore, the interference of the sensor on the pickup signal of the microphone may be removed by subtracting the interference noise signal from the first voice signal. It should be noted that in the present embodiment, the interference noise signal is a known amount.

If it is detected, with the first voice signal, that the sensor is in an in-operation state, the first voice signal is output.

In a specific implementation, the first voice signal in the method of denoising provided by the embodiment of the present disclosure may be a time domain signal, and the interference noise signal may be a frequency domain signal. Further, the step of removing the interference noise signal may include: performing frequency domain transform on the first voice signal to obtain a first frequency domain signal; subtracting the interference noise signal from the first frequency domain signal; and performing frequency domain inverse transform on the first frequency domain after the interference is removed to obtain the first voice signal after the interference is removed.

Optionally, the first voice signal may be subjected to frequency domain transform by using a fast fourier transform, and the first frequency domain signal after the interference is removed may be subjected to the frequency domain inverse transform by using inverse fast fourier transform.

The subtracting the interference noise signal from the first frequency domain signal specifically includes: subtracting the signal on each frequency in the interference noise signal from the signal on the corresponding frequency in the first frequency domain signal. For example, if the first frequency domain signal is a signal having a frequency of 105 Hz to 108 Hz, the signal value at a frequency of 105 Hz in the interference noise signal is subtracted from the signal value at a frequency of 105 Hz in the first frequency domain signal, to obtain the signal value at a frequency of 105 Hz in the first frequency domain signal after the interference is removed; the signal value at a frequency of 106 Hz in the interference noise signal is subtracted from the signal value at a frequency of 106 Hz in the first frequency domain signal, to obtain the signal value at a frequency of 106 Hz in the first frequency domain signal after the interference is removed; . . . . By analogy, the first frequency domain signal with the interference removed therefrom is calculated. It should be noted that the above example is only used to describe the manner in which the interference noise signal is subtracted from the first frequency domain signal, and the frequency therein does not have a defined meaning and an actual meaning.

S103: outputting the first voice signal with the interference removed therefrom.

When the interference noise signal in the first voice signal is removed, the first voice signal with the interference removed therefrom is output.

According to the method of denoising is provided by the embodiment of the present disclosure, a first voice signal picked up by a microphone is received, if it is detected, with the first voice signal, that a sensor packed in the same module with the microphone is in an operation state, an interference noise signal obtained in advance is subtracted from the first voice signal so as to obtain and output a first voice signal with the interference removed therefrom. Since the interference noise signal is an interference noise signal generated with regard to the microphone during an operation of the sensor, and the interference generated with regard to the microphone during an operation of the sensor can be removed by subtracting an interference noise signal from the first voice signal. Thereby, interference in a signal collected by a microphone when the microphone and a sensor in a module operate together is reduced and the small size of the module, packaged with the microphone and sensor, is guaranteed.

An application scenario of the method of denoising provided by the embodiment of the present disclosure is further described in the following.

It is assumed that the method provided by the embodiment of the present disclosure is applied to a smart phone. The built-in microphone of the smart phone picks up the voice signal, and the processor of the smart phone receives the voice signal. If it is detected, with the voice signal, that the sensor packaged in the same module with the microphone is in the operation state, the interference noise signal generated by the senor from the voice signal so as to obtain and output a voice signal with the interference removed therefrom.

Figure 2:
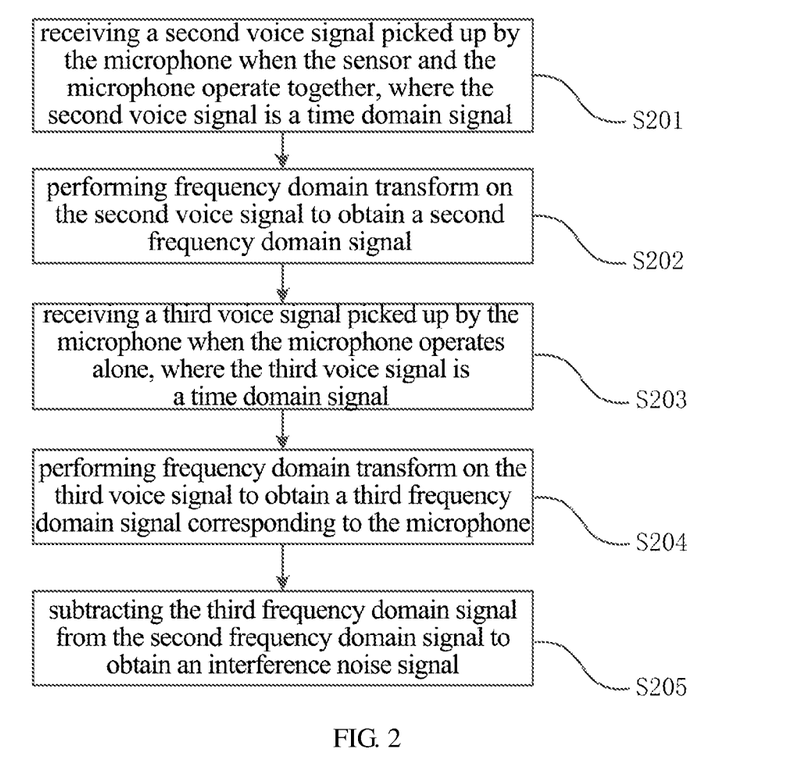
FIG. 2 is a flow chart of steps of a method of denoising according to another embodiment of the present disclosure.

The interference noise signal is a crucial parameter in the denoising process, which may be set by those skilled in the arts according to the characteristics of the module of the microphone and the sensor; of course, in an alternative embodiment, it may also be obtained by the following steps included in the second embodiment shown in FIG. 2:

S201: receiving a second voice signal picked up by the microphone when the sensor and the microphone operate together, where the second voice signal is a time domain signal.

S202: performing frequency domain transform on the second voice signal to obtain a second frequency domain signal.

S203: receiving a third voice signal picked up by the microphone when the microphone operates alone, where the third voice signal is a time domain signal.

S204: performing frequency domain transform on the third voice signal to obtain a third frequency domain signal corresponding to the microphone.

S205: subtracting the third frequency domain signal from the second frequency domain signal to obtain an interference noise signal.

It should be noted that the second voice signal in the embodiment of the present disclosure is only the voice signal that is picked up by the microphone when the sensor and the microphone in the same module operate together, and the embodiment of the present disclosure does not limit the type of the signal included in the second voice signal. For example, the second voice signal may include: a voice signal sent by the user, a noise floor of the microphone, and an interference noise signal generated by the sensor with regard to the microphone when the sensor operates; for another example, the second voice may only include: the noise floor of the microphone, and the interference noise signal generated by the sensor with regard to the microphone when the sensor operates.

Consistent with the type of signal included in the second voice signal, the third voice signal in the implementation of the present disclosure may include a voice signal sent by the user and a noise floor of the microphone; and the third voice signal may also include only the noise floor of the microphone. That is, when the second voice signal includes: a voice signal sent by the user, a noise floor of the microphone, and an interference noise signal generated by the sensor with regard to the microphone when the sensor operates, the third voice signal includes a voice signal sent by the user, and the noise floor of the microphone. When the type of signal included in the second voice signal is another case, the type of signal included in the third voice signal is correspondingly another case.

The microphone for picking up the voice signal in the embodiment of the present disclosure may be a microphone for picking up a voice signal in S101, or other microphones having the same characteristics as the microphone for picking up a voice signal in S101. When the microphone in the present embodiment is a microphone in S101, correspondingly, the sensor in the present embodiment is a sensor packaged in the same module with the microphone in S101; otherwise, the sensor is a sensor packaged in the same module with a microphone having the same characteristics as the microphone in S101.

Specifically, the step of the receiving the second voice signal includes: controlling the sensor and the microphone to be turned on; and receiving the second voice signal input to the microphone.

Specifically, the step of the receiving the third voice signal includes: controlling the sensor to be turned off, and the microphone to be turned on; and receiving the third voice signal input to the microphone.

The method of controlling the sensor to be turned off may be: cutting off the power of the sensor; or sending a standby signal to the sensor without cutting off the power of the sensor.

The controlling the sensor/microphone to be turned on may be: turning on the power of the sensor/microphone; or, while turning on the power of the sensor/microphone, adding an excitation signal to the sensor/microphone.

Figure 3:
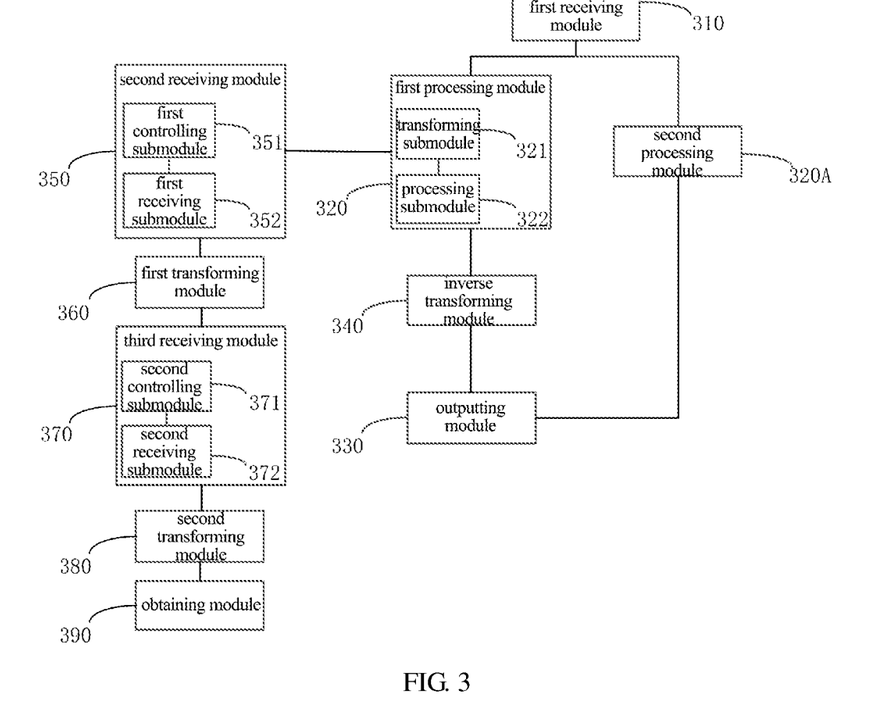
FIG. 3 is a schematic structural diagram of an apparatus of denoising according to still another embodiment of the present disclosure.

Corresponding to the foregoing method embodiment, as shown in FIG. 3, the embodiment of the present disclosure further provides an apparatus of denoising, including: a first receiving module 310, a first processing module 320, and an outputting module 330.

The first receiving module 310 is configured to receive a first voice signal picked up by a microphone.

The first processing module 320 is configured to: if it is detected, with the first voice signal, that a sensor is in an operation state, subtract an interference noise signal obtained in advance from the first voice signal so as to obtain a first voice signal with the interference removed therefrom, where the interference noise signal is an interference noise signal generated with regard to the microphone during an operation of the sensor, and the sensor and the microphone are packaged in the same module.

The outputting module 330 is configured to output the first voice signal with the interference removed therefrom.

An apparatus of denoising provided by the embodiment of the present disclosure, a first voice signal picked up by a microphone is received, if it is detected, with the first voice signal, that a sensor packed in the same module with the microphone is in an operation state, an interference noise signal obtained in advance is subtracted from the first voice signal so as to obtain and output a first voice signal with the interference removed therefrom. Since the interference noise signal is an interference noise signal generated with regard to the microphone during an operation of the sensor, and the interference generated with regard to the microphone during an operation of the sensor can be removed by subtracting an interference noise signal from the first voice signal. Thereby, interference in a signal collected by a microphone when the microphone and a sensor in a module operate together is reduced and the small size of the module, packaged with the microphone and sensor, is guaranteed.

In an optional implementation manner, the interference noise signal is a frequency domain signal, and the first voice signal is a time domain signal.

The first processing module 320 includes a transforming submodule 321 and a processing submodule 322.

The transforming submodule 321 is configured to perform frequency domain transform on the first voice signal to obtain a first frequency domain signal.

The processing submodule 322 is configured to subtract the interference noise signal from the first frequency domain signal.

The apparatus further includes: an inverse transforming module 340, specifically configured to:

prior to triggering the outputting module 330, perform frequency domain inverse transform on the first frequency domain signal with the interference removed therefrom to obtain the first voice signal with the interference removed therefrom.

In an optional implementation manner, the apparatus further includes: a second receiving module 350, a first transforming module 360, a third receiving module 370, a second transforming module 380, and an obtaining module 390.

The second receiving module 350 is configured to receive a second voice signal picked up by the microphone when the sensor and the microphone operate together, where the second voice is a time domain signal.

The first transforming module 360 is configured to perform frequency domain transform on the second voice signal to obtain a second frequency domain signal.

The third receiving module 370 is configured to receive a third voice signal picked up by the microphone when the microphone operates alone, where the third voice signal is a time domain signal.

The second transforming module 380 is configured to perform frequency domain transform on the third voice signal to obtain a third frequency domain signal corresponding to the microphone.

The obtaining module 390 is configured to subtract the third frequency domain signal from the second frequency domain signal to obtain the interference noise signal.

In an optional implementation manner, the second receiving module 350 includes: a first controlling submodule 351 and a first receiving submodule 352.

The first controlling submodule 351 is configured to control the sensor and the microphone to be turned on.

The first receiving submodule 352 is configured to receive the second voice signal input to the microphone.

The third receiving module 370 includes: a second controlling submodule 371 and a second receiving submodule 372.

The second controlling submodule 371 is configured to control the sensor to be turned off, and the microphone to be turned on.

The second receiving submodule 372 is configured to receive the third voice signal input to the microphone.

In an optional implementation manner, the apparatus further includes:

a second processing module 320A is configured to if it is detected, with the first voice signal, that the sensor is not in the operation state, output the first voice signal.

It should be noted that, for the apparatus embodiment, since it is basically similar to the method embodiment, the description is relatively simple, and the relevant parts can be referred to the description of the method embodiment.

The embodiment of the present disclosure further provides a storage medium for storing executable program code, and the executable program code is executed to perform the method of denoising according to the embodiment of the present disclosure.

The embodiment of the present disclosure further provides an application, and the is operative to perform the method of denoising according to the embodiment of the present disclosure at runtime.

Figure 4:
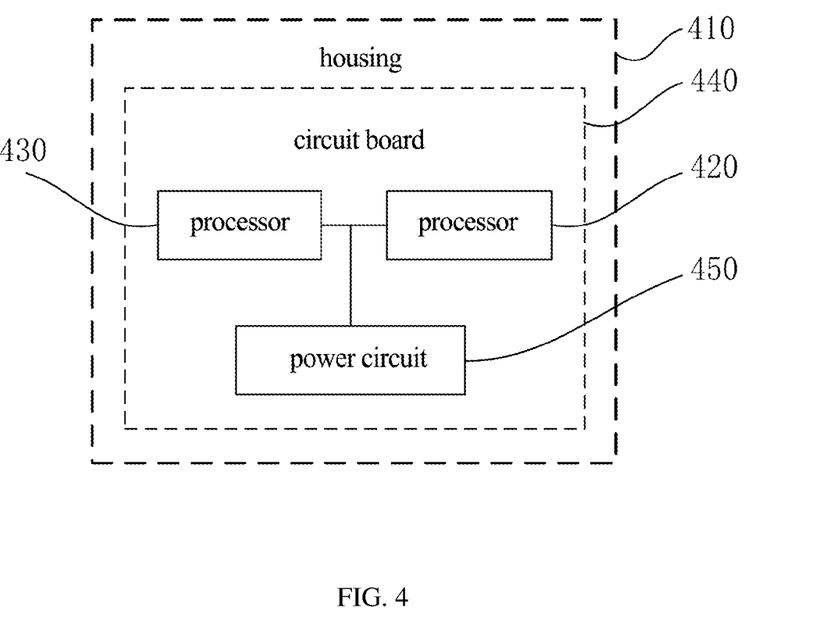
FIG. 4 is a schematic structural diagram of an electronic device of denoising according to still another embodiment of the present disclosure.

As shown in FIG. 4, an embodiment of the present disclosure further provides an electronic device, including: a housing 410, a processor 420, a memory 430, a circuit board 440, and a power circuit 450. The circuit board 440 is disposed inside a space enclosed by the housing 410. The processor 420 and the memory 430 are disposed on the circuit board 440; the power circuit 450 is for powering each circuit or device; the memory 430 for storing executable program code; and the processor 420 runs the executable program code stored in the memory 430 to perform the method of denoising according to the embodiment of the present disclosure.

Those skilled in the art will appreciate that embodiments of the present invention can be provided as a method, system, or computer program product.

Accordingly, the present invention may take the form of an entirely hardware embodiment, an entirely software embodiment, or a combination of software and hardware.

Those skilled in the art should know that the embodiment of the present invention may be provided as a method, a system or a computer program product. Therefore, the present invention may adopt a form of pure hardware embodiment, pure software embodiment and combined software and hardware embodiment. Moreover, the present invention may adopt a form of computer program product implemented on one or more computer-available storage media (including, but not limited to, a disk memory, a Compact Disc Read-Only Memory (CD-ROM) and an optical memory) including computer-available program codes.

The present invention is described with reference to flowcharts and/or block diagrams of the method, a device (system) and computer program product according to the embodiment of the present invention. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction apparatus may be generated by the instructions stored in the computer-readable memory, the instruction apparatus realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

In a typical configuration, a computing device includes one or more CPUs, an input/output interface, a network interface and a memory.

The memory may include forms of a volatile memory, Random Access Memory (RAM) and/or non-volatile memory, etc. in computer-readable media, for example, a Read-Only Memory (ROM) or a flash RAM. The memory is an example of the computer-readable medium.

The computer-readable medium includes non-volatile, non-volatile, removable and fixed media and may store information by any method or technology. The information may be a computer-readable instruction, a data structure, a program module or other data. Examples of a computer storage medium includes, but not limited to, a Phase-change RAM (PRAM), a Static RAM (SRAM), a Dynamic RAM (DRAM), a RAM of other types, a ROM, an Electrically Erasable Programmable ROM (EEPROM), a flash memory or other memory technologies, a CD-ROM, a Digital Video Disk (DVD) or other optical memories, a cassette tape, a tape disk memory or other magnetic storage devices or any other non-transmission media, and may be configured to store information accessible for the computing device. It is defined herein that the computer-readable medium does not include transitory media, for example, a modulated data signal and a carrier.

It is also to be noted that terms "include", "contain" or any other variants thereof are intended to include nonexclusive inclusions, thereby ensuring that a process, method, commodity or device including a series of elements not only includes those elements but also includes other elements which are not clearly listed or further includes elements intrinsic to the process, the method, the commodity or the device. Under the circumstance of no more restrictions, an element defined by statement "including a/an" does not exclude existence of another element which is the same in a process, method, commodity or device including the element.

Those skilled in the art should know that the embodiment of the present invention may be provided as a method, a system or a computer program product. Therefore, the present invention may adopt a form of pure hardware embodiment, pure software embodiment and combined software and hardware embodiment. Moreover, the present invention may adopt a form of computer program product implemented on one or more computer-available storage media (including, but not limited to, a disk memory, a Compact Disc Read-Only Memory (CD-ROM) and an optical memory) including computer-available program codes.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A method of denoising, comprising:
    receiving a first voice signal picked up by a microphone;
    detecting whether a sensor is in an operation state, while receiving the first voice signal;
    when the sensor is in the operation state, subtracting an interference noise signal obtained in advance from the first voice signal so as to obtain a first voice signal with the interference removed therefrom, wherein the interference noise signal is an interference noise signal generated with regard to the microphone during an operation of the sensor, and the sensor and the microphone are packaged in the same module; and
    outputting the first voice signal with the interference removed therefrom.

2. The method according to claim 1, wherein the interference noise signal is a frequency domain signal, and the first voice signal is a time domain signal;
    the subtracting the interference noise signal obtained in advance from the first voice signal, comprises:
    performing frequency domain transform on the first voice signal to obtain a first frequency domain signal; and
    subtracting the interference noise signal from the first frequency domain signal;
    prior to the outputting the first voice signal with the interference removed therefrom, further comprises:
    performing frequency domain inverse transform on the first frequency domain signal with the interference removed therefrom to obtain the first voice signal with the interference removed therefrom.

3. The method according to claim 1, wherein the method further comprises:
    receiving a second voice signal picked up by the microphone when the sensor and the microphone operate together, wherein the second voice signal is a time domain signal;
    performing frequency domain transform on the second voice signal to obtain a second frequency domain signal;

receiving a third voice signal picked up by the microphone when the microphone operates alone, wherein the third voice signal is a time domain signal;

performing frequency domain transform on the third voice signal to obtain a third frequency domain signal corresponding to the microphone; and subtracting the third frequency domain signal from the second frequency domain signal to obtain the interference noise signal.

4. The method according to claim 3, wherein the receiving the second voice signal picked up by the microphone when the sensor and the microphone operate together, comprises:

controlling the sensor and the microphone to be turned on; and receiving the second voice signal input to the microphone;

the receiving the third voice signal picked up by the microphone when the microphone operates alone, comprises:

controlling the sensor to be turned off, and the microphone to be turned on; and receiving the third voice signal input to the microphone.

5. The method according to claim 1, wherein the method further comprises:

when the sensor is not in the operation state, outputting the first voice signal.

6. An apparatus of denoising, comprising:

a memory storing instructions; and a processor to execute the instructions to:

receive a first voice signal picked up by a microphone;

detect whether a sensor is in an operation state, while receiving the first voice signal;

when the sensor is in the operation state, subtract an interference noise signal obtained in advance from the first voice signal so as to obtain a first voice signal with the interference removed therefrom, wherein the interference noise signal is an interference noise signal generated with regard to the microphone during an operation of the sensor, and the sensor and the microphone are packaged in the same module; and output the first voice signal with the interference removed therefrom.

7. The apparatus according to claim 6, wherein the interference noise signal is a frequency domain signal, and the first voice signal is a time domain signal;

the apparatus is specifically configured to:

perform frequency domain transform on the first voice signal to obtain a first frequency domain signal; and subtract the interference noise signal from the first frequency domain signal;

perform frequency domain inverse transform on the first frequency domain signal with the interference removed therefrom to obtain the first voice signal with the interference removed therefrom, prior to outputting the first voice signal with the interference removed therefrom.

8. The apparatus according to claim 6, wherein the apparatus is specifically configured to:

receive a second voice signal picked up by the microphone when the sensor and the microphone operate together, wherein the second voice is a time domain signal;

perform frequency domain transform on the second voice signal to obtain a second frequency domain signal;

receive a third voice signal picked up by the microphone when the microphone operates alone, wherein the third voice signal is a time domain signal;

perform frequency domain transform on the third voice signal to obtain a third frequency domain signal corresponding to the microphone; and subtract the third frequency domain signal from the second frequency domain signal to obtain the interference noise signal.

9. The apparatus according to claim 8, wherein the apparatus is specifically configured to:

control the sensor and the microphone to be turned on; and receive the second voice signal input to the microphone;

control the sensor to be turned off, and the microphone to be turned on; and receive the third voice signal input to the microphone.

10. The apparatus according to claim 6, wherein the apparatus is specifically configured to:

when the sensor is not in the operation state, output the first voice signal.

11. A non-transitory storage medium, wherein the storage medium is for storing executable program code, and the executable program code is executed to perform the method of denoising according to claim 1.

12. An electronic device, comprising: a housing, a processor, a memory, a circuit board, and a power supply circuit, wherein the circuit board is disposed inside a space enclosed by the housing, the processor and the a memory are disposed on the circuit board; the power circuit is for powering each circuit or device; the memory is for storing executable program code; and the processor runs the executable program code stored in the memory to perform the method of denoising according to claim 1.

13. A non-transitory storage medium, wherein the storage medium is for storing executable program code, and the executable program code is executed to perform the method of denoising according to claim 2.

14. A non-transitory storage medium, wherein the storage medium is for storing executable program code, and the executable program code is executed to perform the method of denoising according to claim 3.

15. A non-transitory storage medium, wherein the storage medium is for storing executable program code, and the executable program code is executed to perform the method of denoising according to claim 4.

16. A non-transitory storage medium, wherein the storage medium is for storing executable program code, and the executable program code is executed to perform the method of denoising according to claim 5.

* * * * *